United States Patent [19]

Maroney et al.

[11] Patent Number: 4,892,114

[45] Date of Patent: Jan. 9, 1989

[54] FLOW-SENSING SHUTOFF VALVE

[75] Inventors: G. Earl Maroney, Clarkston; Mark W. Dallas, Ortonville; Christopher West, Clawson; John A. Diemer, Auburn Hills; Mark B. Chamberlin, Royal Oak, all of Mich.

[73] Assignee: M. C. Aerospace Corporation, Lake Orion, Mich.

[21] Appl. No.: 337,334

[22] Filed: Apr. 13, 1989

[51] Int. Cl.$^4$ .............................................. G05D 7/00
[52] U.S. Cl. ..................................................... 137/87
[58] Field of Search ...................... 137/87, 100, 101.19

[56] References Cited

U.S. PATENT DOCUMENTS 3,570,517  3/1971  Odenthal ............................... 137/87
3,974,742  8/1976  Johnson ............................. 137/87 X Primary Examiner—Alan Cohan
Attorney, Agent, or Firm—Joseph W. Farley

[57] ABSTRACT

A flow-sensing shutoff valve connectable between upstream and downstream portions of a hydraulic system comprises a valve body having pressure entrance and return exit ports connectable to the upstream portion of the system, and pressure exit and return entrance ports connectable to the downstream portion of the system. A valve element within the valve body is movable between a normally open position in which the pressure and return entrance and exit ports are connected by separate passages in the valve body, and a closed position in which the passages are blocked. Pressure and return flowmeters are adapted to sense fluid flow in the passages between the valve element and the pressure exit port and the return exit port, respectively. Flow rate signals from the flowmeters are compared in a control circuit and in response to a certain flow differential, an output signal drives an actuator which moves the valve element to closed position, isolating the downstream from the upstream portion of the hydraulic system.

15 Claims, 3 Drawing Sheets

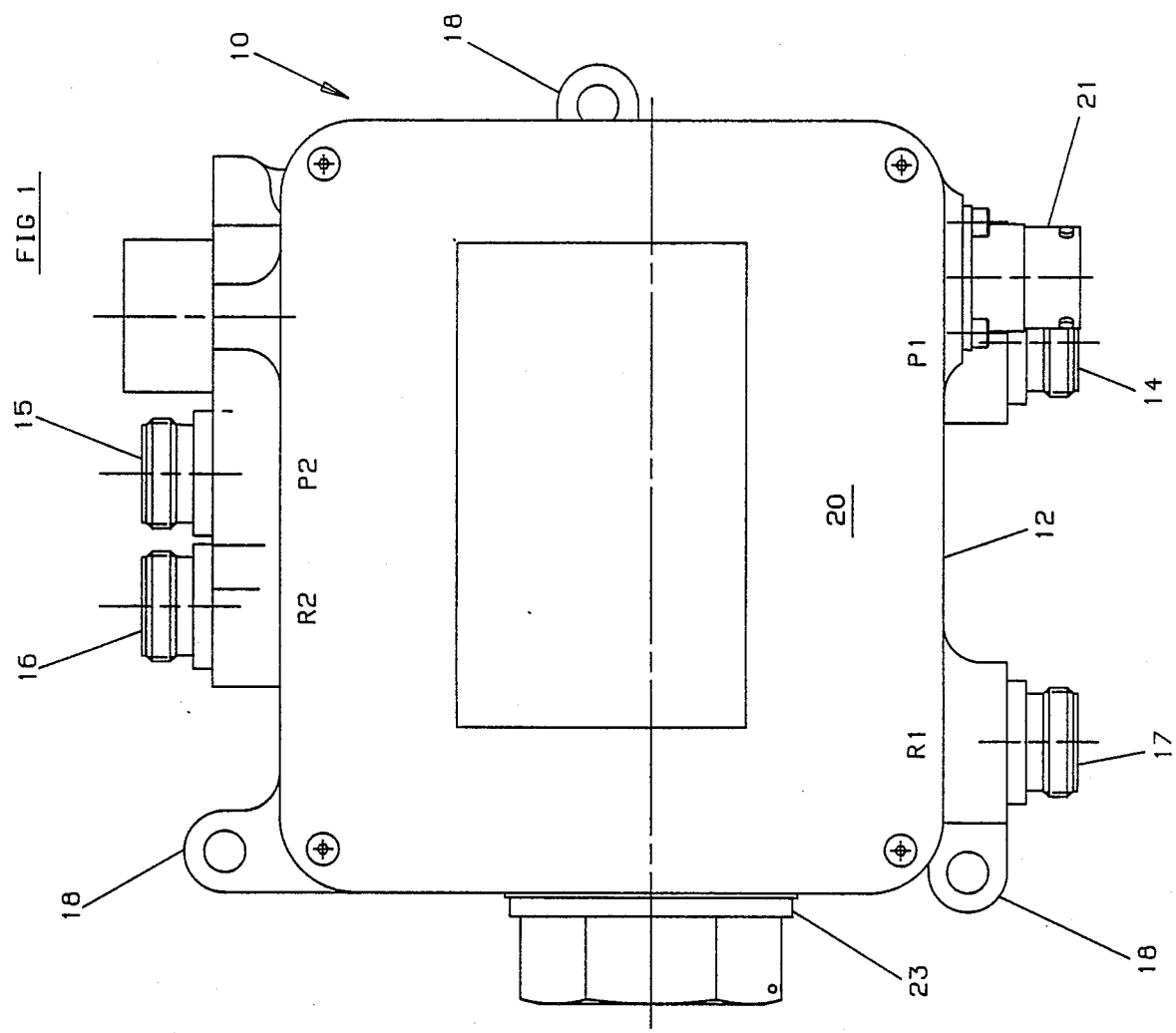
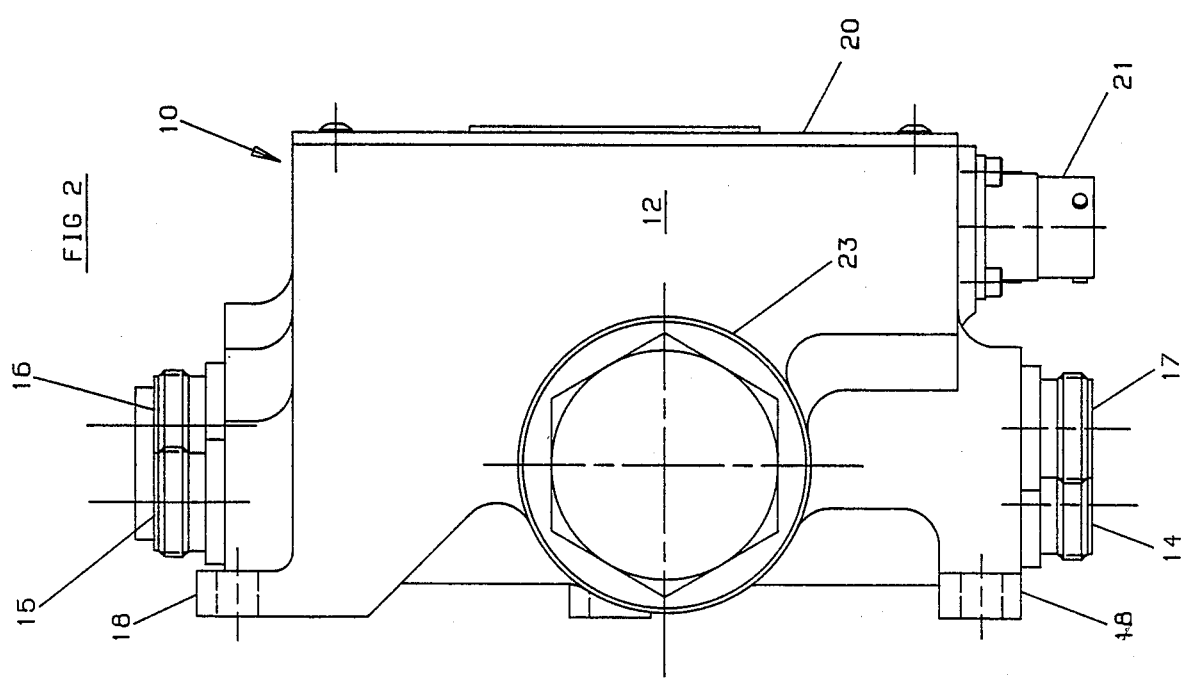

FLOW-SENSING SHUTOFF VALVE

SUMMARY OF THE INVENTION

This invention relates to improvements in a flow-sensing shutoff valve operable to monitor the pressure and return fluid flow in any desired portion of a hydraulic system and to shutoff the fluid flow in the event that a flow differential of a certain magnitude is determined to exist.

In aircraft hydraulic flight control systems, for example, a certain amount of reliability is presently obtained by providing two parallel separate systems, each supplied by a pump. However, should a leak develop from any cause anywhere in one of the systems, the resultant loss of hydraulic fluid will disable that entire system. The aircraft then becomes vulnerable to a leak in the second system which would cause a loss of that system and of the aircraft itself. One solution to that problem is to divide each hydraulic system into subsystems and to provide for each subsystem a shutoff valve that will stp fluid flow to a leaking subsystem so that the operability of the remainder of the hydraulic system is maintained.

Such shutoff valves have been proposed. Examples are disclosed in U.S. Pat. Nos. 3,685,531, 3,771,543 and 4,355,654. Each of the various prior valve constructions taught by these patents is relatively complex, and operates by comparing, in pressure and return fluid flows, pressure differentials created by the provisions of orifices in the flow paths. Aside from the complexity, and hence the cost, of these prior constructions, their flow sensing elements are exposed to pressure and return flow condition which can both vary and differ, one from the other, so that the accuracy of any comparison can be adversely affected, resulting in unreliable operation.

The flow-sensing shutoff valve of the present invention provides a simple, reliable, cost-effective solution to the problem of stopping fluid loss in a hydraulic subsystem by isolating that subsystem when a leak therein is indicated by the sensing of a pressure and return flow differential condition, for example, a differential in excess of a certain percent of rated fluid flow.

A presently preferred flow-sensing shutoff valve of the invention comprises a valve body having fluid pressure entrance and exit ports and fluid return entrance and exit ports. Valve means mounted within the valve body is connected by separate passages to each of the ports and is movable between a normally open position, in which the pressure and return entrance and exit ports are connected by their respective passages, and a closed position in which the connections between the pressure and return entrance and exit ports are blocked. Pressure and return flowmeters are mounted in the valve body, the pressure flowmeter being adapted to sense fluid flow in the passage between the valve means and the pressure exit port, the return flowmeter being adapted to sense fluid flow in the passage between the valve means and the return exit port, and each flowmeter is adapted to produce a flow rate signal proportional to the fluid flow sensed. The construction of the valve means and the exit passages in which the pressure and return flows are sensed are such as to create comparable turbulent pressure and return flow conditions, insulated from upstream variations. Control means connected to the pressure and return flowmeters compares their flow rate signals and produces an output signal in response to a differential condition between the flow rate signals indicative of a fault in the subsystem to which the flow-sensing shutoff valve is connected. The output signal is applied to actuator means for moving the valve means to closed position.

Preferably, the flow-sensing shutoff valve incorporates the features summarized below.

The valve means is a sleeve and spool type designed to provide, in the normally open position, axial flow connections between the sleeve and spool from the entrance to the exit passages and these connections create the comparable turbulent flow conditions in the exit passages which are structurally similar. Poppet type valve means are employable but are more vulnerable to any foreign matter in the hydraulic system.

The flowmeters are target-type and the control means is adapted to convert their flow rate signals, which are proportional to the square of the flow rate, to signals representing the square root of these flow rate signals. Turbine or sonic type flowmeters can alternatively be used.

The control means employs a microprocessor programmed to monitor the flow rate signals (converted from analog to digital), to periodically obtain a differential signal, to tabulate and average a number of consecutive differential signals, to update the tabulation and average with each successive differential signal, and to produce an output signal when the average represents a flow rate difference exceeding a value established for triggering shutoff. The microprocessor is also programmable to compensate for signal to noise, transient signals and other factors including the square root conversion mentioned above. An analog type of control can be used, if desired.

The actuator means comprises a pilot valve, operated by a solenoid energized by the output signal, for applying to the spool valve fluid pressure which moves it from the normally open to the closed position. The spool is spring returned to the open position when the solenoid is deenergized.

The foregoing and other features and advantages of the invention will appear from the description to follow of the embodiment disclosed in the accompanying drawings.

DESCRIPTION OF THE DRAWINGS

FIG. 1 is a plan view of a flow-sensing shutoff valve constructed in accordance with the present invention;

FIG. 2 is an end elevation of the valve of FIG. 1;

DETAILED DESCRIPTION

Figures 3, 4:
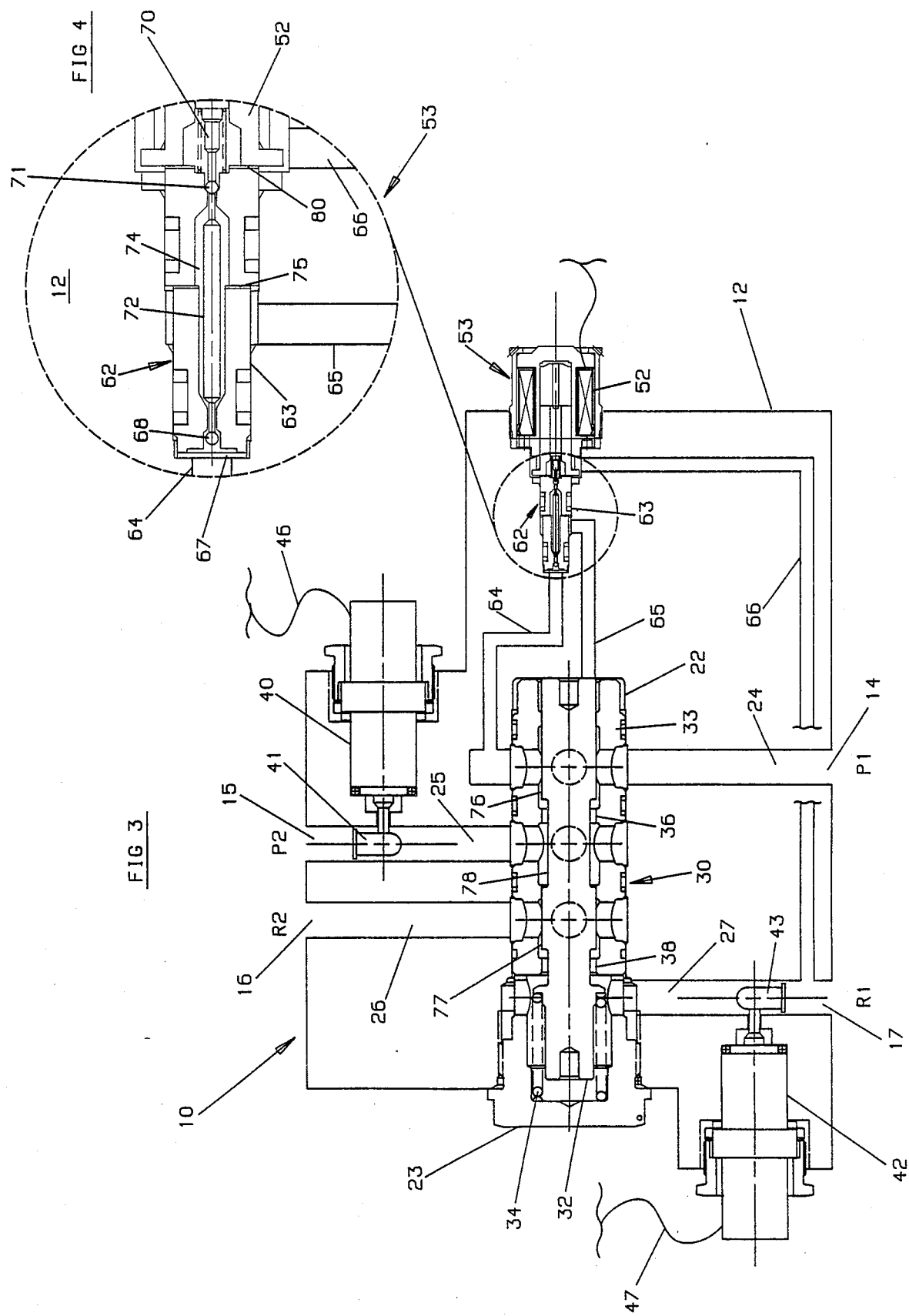
FIG. 3 is a schematic view showing the components within the valve of FIG. 1.
FIG. 4 is an enlarged showing of the components within the portion of FIG. 3 indicated by the broken line circle.

The flow-sensing shutoff valve 10 shown in FIGS. 1 and 2 comprises a valve body 12 provided with four ports which enable the valve 10 to be installed in the fluid pressure and return line (not shown) between upstream and downstream portions of a hydraulic system. These ports consist of fluid pressure entrance and exit ports 14 and 15 and fluid return entrance and exit ports 16 and 17. Thus the pressure entrance port 14 and the return exit port 17 are connected to the pressure and return lines of the hydraulic system on the upstream or pump side of the valve 10; and the pressure exit port 15 and the return entrance port 16 are connected to the pressure and return lines of the hydraulic system on the downstream side of the valve extending to and from some device to be hydraulically operated. Mounting lugs 18 are provided on the base portion of the valve body 12 and the upper portion of the valve body includes a control module receptacle enclosed by a cover 20. An electrical power connector 21 projects from one side of the valve body.

Internally, the valve body 12 is formed with a generally cylindrical valve chamber 22 (FIG. 3) closed by a threaded end cap 23, and with pressure and return passages separately connecting the entrance and exit ports to the valve chamber 22. The pressure passages consist of a pressure entrance passage 24 from the port 14 to the chamber 22, and a pressure exit passage 25 from the chamber to the port 15. The return passages consist of a return entrance passage 26 from the port 16 to the chamber, and a return exit passage 27 from the chamber to the port 17.

Valve means 30 is mounted in the valve chamber 22 and in the construction shown in FIG. 3 consists of a spool 32 slidably supported within a sleeve 33 fixed in the valve chamber 22, the valve spool being movable between open and closed positions and being biased to the normally open position shown by a spring 34 interposed between the end cap 23 and an annular shoulder on the valve spool 32. In this open position, the complementary internal configuration of the sleeve 33 and external configuration of the spool 32 are such as to provide an axial connection 36 between the pressure entrance and exit passages 24 and 25 and to provide an axial connection 38 between the return entrance and exit passages 26 and 27. The connections 36 and 38 are annular in form, are designed to produce fluid pressure drops of substantially equal magnitude, and are also designed to act as turbulators for inducing comparable turbulent flow of hydraulic fluid passing through the connections 36 and 38 and into the respective exit passages 25 and 27

Mounted in the valve body 12 are a target type pressure flowmeter 40 having a target or flow sensing element 41 positioned in the pressure exit passage 25, and a target type return flow meter 42 having a target or flow sensing element 43 positioned in the return exit passage 27. The pressure and return flowmeters 40 and 42 are adapted to sense the fluid flow in their respective pressure and return passages and to produce flow rate signals respectively proportional to the pressure fluid low and to the return fluid flow. In the normally open position of the valve pool 32, the pressure and return fluid flows sensed by the pressure and return flowmeters are made to be as comparable to each other as possible by installing he flowmeters in the pressure and return exit passages 25 and 27 on downstream sides of and substantially equidistant from the valve means 30 which therefore acts to insulate the flowmeters from upstream flow variations; by constructing the exit passages 25 and 27 so that they are structurally similar to each other; and by employing the valve means 30 as a turbulator, as mentioned above, to induce comparable turbulent flow conditions upstream of the flowmeters. In other words, essentially equivalent flow patterns are produced at the flowmeters when the flows are equal, and the flow rate signals are therefore equivalent.

Figure 5:
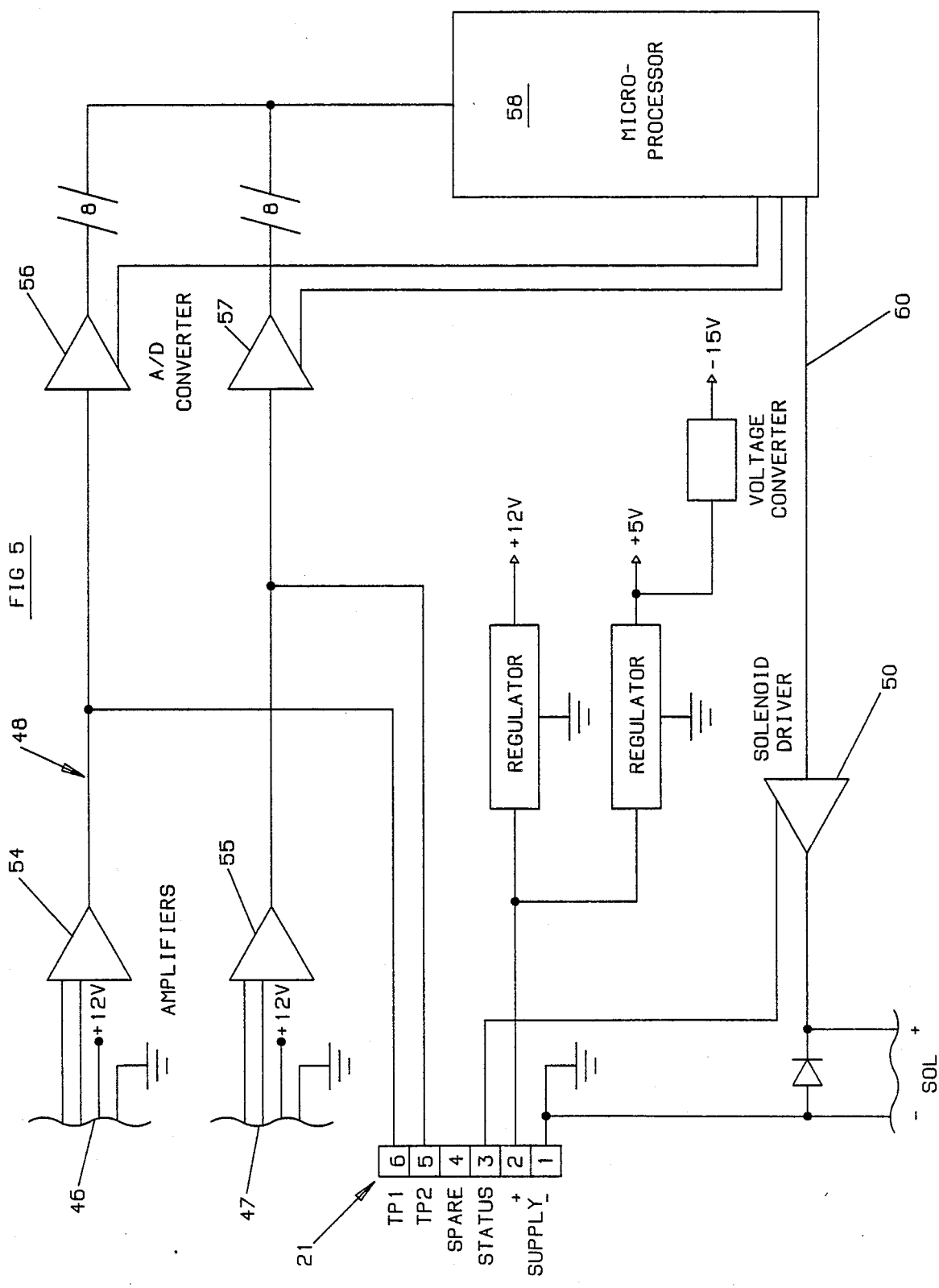
FIG. 5 is a schematic control diagram for a valve of the invention.

These flow rate signals are supplied through conductors 46 and 47 to control means 48, schematically shown in FIG. 5, for comparing the pressure flow rate signal with the return flow rate signal and producing an output signal in response to a certain differential condition between the flow rate signals. The output signal, through a solenoid driver 50, energizes a solenoid 52 of a valve actuator means 53 (FIGS. 3 and 4) for moving the valve spool 32 from normally open to closed position.

In the specific control means 48 shown in FIG. 5, the pressure and return flow rate signals are respectively amplified by amplifiers 54 and 55, are converted from analog to digital signals by A/D converters 56 and 57, and are supplied to a microprocessor 58. The microprocessor 58 is programmed to perform the following unctions:

a. obtain pressure and return input signals representing the square root of the flow rate signals, preferably filtered to reduce signal to noise and transient factors The square root conversion is necessary in the case of a target-type flowmeter as its output signal is proportional to the square of the flow rate and therefore nonlinear. Compensation can also be provided for any nonlinearity in the converted signal to flow rate relation.

b. periodically, after a start-up delay, (e.g. each 25 m s) compare the input signals, determine and store the differential signal, and average a certain number of consecutively stored differential signals.

c. on each repetition of step b for the next differential signal, update the average to maintain a running average value always based on the most recent differential signals equal to the number used for the average.

d. in the event that any average value indicates a differential flow rate in excess of a predetermined amount, an output signal is supplied through lead 60 to the solenoid driver 50, energizing the solenoid 52 and closing the valve spool 32 by the actuator means 53.

The microprocessor programming described above may also include an override function that triggers an output signal in less time in the event that a greater flow differential is sensed. In general, the microprocessor is capable, by appropriate software, of producing an output signal based on an instantaneous flow differential, on an average flow differential, on total system leakage, or on any or all of these criteria.

Control integrity can be increased by employing a plurality of microprocessors operating in parallel, and arranged so that an output signal results from a flow differential condition sensed by more than one microprocessor—for example, a condition sensed by any two of three microprocessor.

Referring to FIGS. 3 and 4, the actuator means 53 disclosed comprises a two ball pilot valve 62 operated by the solenoid 52 and mounted in a socket 63 in the valve body 12. A pressure supply connection 64 extends from the pressure inlet passage 24 to one end of the socket 63, a pressure discharge connection 65 extends from the socket 63 to the inner end of the valve chamber 22, and a flow return connection 66 extends from the socket 63 to the return exit passage 27. In the inactive position of the pilot valve shown in FIGS. 3 and 4, supply pressure in the connection 64 acts against and is blocked by a seated ball 68 positioned within a retainer screen 67.

When the solenoid 52 is energized in response to an output signal from the control means 48, the plunger 70 of the solenoid acts through a ball 71 against a pilot valve member 72, shift ring it to the left as viewed in FIG. 4 and unseating the ball 68. Supply pressure is then applied through central and radial passage 74 and 75 of the pilot valve 62 and through the pressure outlet connection 65 to the inner ed of the valve spool 32, moving the valve spool 32 to closed position against the biasing force of the valve spring 34. In this closed position, a land portion 76 on the valve spool 32 blocks the connection between the pressure inlet an exit passages 24 and 25; a second land portion 77 on the valve spool 32 blocks the connection between the return entrance and exit passages 26 and 27; and, a recessed portion 78 on the valve spool 32 establishes a connection between the return entrance passage 26 and the pressure exit passage 25. Fluid flow from the entrance pressure port 14 to the exit pressure port 15 is shutoff and the subsystem connected to the ports 15 and 16 is isolated from the portion of the hydraulic system upstream of the valve 10. Any backflow of fluid through the return passages 27 and 26 is prevented.

The valve spool 32 will remain in closed position until the solenoid 52 is deenergized by interrupting power to the supply terminals shown in FIG. 5. Then, the pilot valve ball 68 will reseat and the valve spool 32 will be returned to open position by the valve spring 34, displacing fluid in the valve chamber 22 back to the return exit passage 27 through the connection 65, the pilot valve radial and central passages 75 and 74, a second pilot valve radial passage 80, and the return connection 66.

Those skilled in the art will appreciate that the construction of any particular embodiment of the flow-sensing shut-off valve of the invention will depend on the operating characteritics of the hydraulic system in which the valve is to be installed, on the available electrical power supply, and on a decision as to what flow differential condition or conditions will trigger shutoff. For example, these criteria may require a valve 10 having a rated flow of 9 GPM at 3000 psig, powered by 28 volts DC. A flow differential of greater than 5% of rated flow, or 0.45 GPM is decided to indicate a leakage fault in the subsystem to be monitored and isolated in the event that such a fault is detected. These parameters will govern the design of the valve 10 and the selection of the flowmeters 40 and 42, whose operating characteristics will in turn determine the hardware employed in the control means 48.

With such a flow-sensing shutoff valve 10 installed as desired between upstream and downstream portion of the hydraulic system, under normal conditions rated flow of 9 GPM at 3000 psig enters the valve through port 14, passes through the valve means 30, and is continuously measured by the pressure flowmeter 40. Return flow enters the valve through the port 16, passes through the valve means 30, and is continuously measured by the return flowmeter 42. The control means 48 senses a differential flow of less than 5% of rated flow and the valve means 30 remains in normally open position. Should the control means 48 sense a difference between the flow rate signals from the flowmeters 40 and 42 indicating a differential flow greater than 5% of rated flow, a fault in the downstream portion of the hydraulic system is considered to exist, the solenoid 52 is energized, and the valve means 30 shifts to closed position, isolating the downstream portion of the system and preserving the integrity of the upstream portion until the electrical power supply to the valve 10 is interrupted. Fluid circulation through the isolated downstream portion itself is permitted so as not to interfere with the operation by a back-up system of any device connected to the downstream portion.

We claim:

1. A flow-sensing shutoff valve adapted to be installed in fluid pressure and return lines between upstream and downstream portions of a hydraulic system for isolating the downstream portion in response to a leakage condition therein, said valve comprising:

a valve body having fluid pressure entrance and fluid return exit ports connectable to the upstream fluid pressure and return lines, fluid pressure exit and fluid return entrance ports connectable to the downstream fluid pressure and return lines;

valve means within said valve body, and pressure and return passage means in said valve body for connecting said ports to said valve means, said valve means being movable between a normally open position in which said fluid pressure and fluid return entrance and exit ports are respectively connected by said pressure and return passage means and a closed position in which at least the connection between said fluid pressure entrance and exit ports is blocked;

pressure and return flowmeter means mounted in said valve body for sensing the fluid flow in said pressure and return passage means, said pressure and return flowmeter means being adapted to produce flow rate signals respectively proportioned to the pressure fluid flow and to the return fluid flow, and conditions in said pressure and return passage means upstream of said pressure and return flowmeter means;

control means connected to said pressure and return flow meter means for producing an output signal in response to a differential condition between said flow rate signals; and actuator means for moving said valve means to said closed position in response to said output signal.

2. A flow-sensing shutoff valve according to claim 1, wherein said pressure flowmeter means is mounted in the portion of said pressure passage means which connects said valve means to said fluid pressure exit port, and said return flowmeter means is mounted in the portion of said return passage means which connects said valve means to said fluid return exit port, whereby said pressure and return flowmeter means are each insulated from upstream fluid flow conditions by said valve means, said pressure passage means portion and said return passage means portion being constructed so as to have substantially the same fluid flow characteristics.

3. A flow-sensing shutoff valve according to claim 2 wherein said pressure and return flowmeter means each comprises a target flowmeter.

4. A flow-sensing shutoff valve according to claim 2, wherein said valve means comprises a valve sleeve and a valve spool slidably mounted therein, said valve sleeve and valve spool having configurations such as to provide in said normally open position pressure and return connections in said pressure and return passage means respectively, said pressure and return connections constituting said turbulator means.

5. A flow-sensing shutoff valve according to claim 4 wherein said valve sleeve and valve spool configurations are such as to provide in said closed position a connection between said fluid pressure exit and fluid return entrance ports.

6. A flow-sensing shutoff valve according to claim 5 wherein said pressure and return flowmeter means each comprises a target flowmeter.

7. A flow-sensing shutoff valve according to claim 6 wherein said actuator means comprises a pilot valve mounted in said valve body, said pilot valve being shiftable from an inactive position to an active position in which fluid pressure in said pressure passage means is applied to said valve spool for moving said valve spool to said closed position, and solenoid means operable by said output signal for shifting said pilot valve to said active position.

8. A flow-sensing shutoff valve according to claim 7 wherein said control means includes means for amplifying said pressure flow rate signal and said return flow rate signal, and means for comparing said amplified signals and producing said output signal in response to a differential condition indicative of a flow differential in excess of a predetermined percentage of the rated flow through said valve.

9. A flow-sensing shutoff valve according to claim 8 wherein said means for comparing said amplified signals comprises at least one microprocessor means for periodically determining a flow differential signal, an average of a certain number of the most current of such flow differential signals, and producing said output signal in response to a differential condition indicated by said average.

10. A flow-sensing shutoff valve comprising:
a valve body having fluid pressure entra and exit port and fluid return entrance and exit ports;
valve means mounted within said valve body, and pressure and return passage means formed in said valve body for separately connecting each of said ports to said valve means, said valve means being movable between a normally open position in which said fluid pressure and fluid return entrance and exit ports are respectively connected by said pressure and return passage means and a closed position in which at least the connection between said fluid pressure entrance and exit ports is blocked;
pressure flowmeter means mounted in said valve body and including a pressure flow sensing element positioned in said pressure passage means between said valve means and said fluid pressure exit port, return flowmeter means mounted in said valve body and including a return flow sensing element positioned in said return passage means between said valve means said fluid return exit port, said pressure and return flowmeter means being adapted to produce flow rate signals respectively proportional to pressure fluid flow and to return fluid flow;
control means connected to said pressure and return flowmeter means for producing an output signal in response to a differential condition between said flow rate signals; and
actuator means for moving said valve means to said closed position in response to said output signal.

11. A flow-sensing shutoff valve according to claim 10 wherein turbulent flow inducing means is disposed on the upstream side of each of said pressure and return flow sensing elements for subjecting said flow sensing elements to comparable turbulent flow conditions.

12. A flow-sensing shutoff valve according to claim 11 where in said turbulent flow inducing means is formed by said valve mean in said normally open position thereof.

13. A flow-sensing shutoff valve according to claim 12 where in said valve means comprises a valve sleeve and a valve spool slidably mounted therein for movement between said normally open and said closed positions, said valve sleeve and said valve spool having complementary internal and external configurations such as to provide in said normally open position pressure and return connections in said pressure and return passage means respectively said pressure and return connections forming said turbulent flow inducing means.

14. A flow-sensing shutoff valve according to claim 13 wherein said pressure flowmeter means and said return flowmeter means comprise a target-type flowmeters having target members forming said pressure and return flow sensing elements.

15. A flow-sensing shutoff valve according to claim 14 wherein said control means includes means for obtaining signals representing the square root of the flow rate signals produced by said target-type flowmeters.

* * * * *

UNITED STATES PATENT AND TRADEMARK OFFICE
CERTIFICATE OF CORRECTION

PATENT NO. : 4,892,114                                      Page 1 of 2

DATED      : January 9, 1990

INVENTOR(S) : G. Earl Maroney et al.

It is certified that error appears in the above-identified patent and that said Letters Patent is hereby corrected as shown below:

Date of Patent "January 9, 1989" should read --January 9, 1990--

Column 1, line 21, "stp" should read --stop--

Column 1, line 33, "condition" should read --conditions--

Column 2, line 62, "line" should read --lines--

Column 3, line 51, "low" should read --flow--

Column 3, line 52, "pool" should read --spool--

Column 3, line 55, "he" should read --the--

Column 4, line 15, "unctions" should read --functions--

Column 4, line 50, "microprocessor" should read --microprocessors--

Column 4, line 67, "shift ring" should read --shifting--

Column 5, line 1, "passage" should read --passages--

Column 5, line 7, "an" should read --and--

Column 5, line 33, "characteritics" should read --characteristics--

Column 6, line 30, after "and" (2nd occurrence) insert --turbulator means for inducing comparable turbulent fluid flow--

Column 7, line 30, "entra" should read --entrance--

Column 7, line 30, "port" should read --ports--

Column 8, line 22, "where in" should read --wherein--

UNITED STATES PATENT AND TRADEMARK OFFICE
CERTIFICATE OF CORRECTION

PATENT NO. : 4,892,114

DATED : January 9, 1990

INVENTOR(S) : G. Earl Maroney et al.

It is certified that error appears in the above-identified patent and that said Letters Patent is hereby corrected as shown below:

Column 8, line 23, "mean" should read --means--

Column 8, line 26, "where in" should read --wherein--

Signed and Sealed this

Eighth Day of January, 1991

Attest:

HARRY F. MANBECK, JR.

*Attesting Officer*      *Commissioner of Patents and Trademarks*